United States Patent [19]

Bruhn et al.

[11] Patent Number: 5,764,016
[45] Date of Patent: Jun. 9, 1998

[54] METHOD FOR POSITIONING A PEN IN A RECORDING DEVICE

[75] Inventors: Arno Bruhn, Wülfrath; Hans-Herbert Kirste, Landesbergen, both of Germany

[73] Assignee: Hartmann & Braun AG, Frankfurt, Germany

[21] Appl. No.: 736,627

[22] Filed: Oct. 24, 1996

[30] Foreign Application Priority Data

Oct. 27, 1995 [DE] Germany .................. 195 41 130.7

[51] Int. Cl.[6] ............................................ G05B 11/28
[52] U.S. Cl. .................. 318/599; 318/599; 318/798; 318/799; 318/800
[58] Field of Search ........................ 318/599, 798, 318/799, 800, 801, 802, 803, 804, 805, 806, 807, 808, 809, 810, 811, 812, 813, 814, 815, 572, 568.22, 632, 650, 663

[56] References Cited

U.S. PATENT DOCUMENTS 5,329,217 7/1994 Kerkman et al. .................... 318/811

FOREIGN PATENT DOCUMENTS

| 0078367 | 5/1983 | European Pat. Off. | ....... G01D 15/24 |
| 0320316 | 6/1989 | European Pat. Off. | ......... G01D 9/40 |
| 3607249 | 3/1986 | Germany | .......................... G01D 9/10 |
| 3607249A1 | 3/1986 | Germany | .......................... G01D 9/10 |

Primary Examiner—William M. Shoop, Jr.
Assistant Examiner—Kim Lockett
Attorney, Agent, or Firm—Michael M. Rickin

[57] ABSTRACT

The invention relates to a method for positioning a pen in a recording device for recording the time profile of a measurement signal which can be connected. In order to implement the highest possible mapping accuracy of the measurement signal onto the recording signal at a low cost and with DC isolation between the measurement signal and drive means of the pen, it is proposed that the positioning error (300) be phase-width modulated, the pulse-width-modulated positioning error (400) be transmitted in a floating manner to a signal converter (70), and a control voltage for the electric motor (90) be determined using the signal converter (70) from the pulse-width-modulated positioning error (400) by normalizing the difference between the pulse duration and the pulse-pause duration, via the sum of the pulse duration and the pulse-pause duration.

3 Claims, 1 Drawing Sheet

METHOD FOR POSITIONING A PEN IN A RECORDING DEVICE

1. FIELD OF THE INVENTION

This invention relates to a method for positioning a pen in a recording device for recording the time profile of a measurement signal which can be connected to the recording device.

2. DESCRIPTION OF THE PRIOR ART

EP 0 078 367 discloses a recording/display apparatus for industrial processes having a movable apparatus whose position indicates the magnitude of a method or process condition to be monitored. The movable apparatus can be driven by a stepping motor which can be operated by sequential pulses from a clock pulse device and with a feedback device for developing a feedback signal corresponding to the position of the moveable apparatus within an overall measurement range of positions of this apparatus with an error device for producing an error signal which indicates the difference between the feedback signal and a measurement signal. In this case, a dead-band device which responds to the error signal is provided for developing a control or regulation signal. The dead-band device responds when the error signal is located outside a predetermined dead-band around the position which is represented by the measurement signal.

· Furthermore, a first circuit device is provided which responds to the initial development of the control or regulation signal in order to activate the stepping motor for the purpose of producing a limited correction effect of a predetermined extent in order to move the apparatus back into the position which is represented by the measurement signal. Also a second circuit device is provided which responds to the control and regulation signal in order to activate the stepping motor beyond the predetermined extent. The second circuit device responds when the error signal is still located outside the dead-band at the end of a predetermined time interval after the activation of the stepping motor by the first device.

This known apparatus has the disadvantage that the bandwidth of the measurement signal, which is predetermined by the dead-band device makes itself evident as a recording error between the actual measurement signal and the recorded signal. Changes to the measurement signal within the bandwidth of the dead-band device are not recorded. To this extent, the bandwidth of the dead-band device is a measure of the recording accuracy and of the quality class of the recording device.

Furthermore, it is known from experience that any reduction in the bandwidth of the dead-band device for the purpose of increasing the recording accuracy leads to instabilities in the positioning control loop. These instabilities make themselves evident in overshoots of the recording signal in comparison with the measurement signal.

Particularly when recording measurement signals which are generated in measurement signal sources which are physically located in an area where there is an explosion risk, DC isolation between measurement signal sources within the area where there is an explosion risk and recording devices and other signal processing means outside the areas where there is an explosion risk are specified as essential.

DE 36 07 249 describes a pen printer which, in principle, is suitable for recording measurement signals from areas where there is an explosion risk. The pen printer is equipped with at least one first unit which is composed of a moving pen carriage which can be moved in a direction at right angles to the movement direction of a curved sheet as a function of the magnitude of a measurement signal. The pen printer is also equipped with a servo unit which has a potentiometer for producing a position feedback signal which is assigned to the position of the pen carriage. The servo unit is designed integrally with a servo amplifier which produces the difference between the measurement signal and the position feedback signal from the potentiometer, and which drives a servo motor in a predetermined direction such that the difference tends to zero, the pen carriage being moveable appropriately and a guidance shaft which is arranged between both sides of one end of a printed circuit board and on which the pen carriage is mounted such that it can be removed, the pen carriage being provided with a pen which can produce recordings on the curved sheet analogous to the magnitude of the measurement signal, the measurement signal being converted using an analogue/digital converter, called an A/D converter in the following text, into a digital signal which is then fed to the servo unit under the control of a microprocessor, via a digital/analogue converter, called a D/A converter in the following text.

In this case, optocouplers are provided between the A/D converters and the microprocessor, via which the digital signal which represents the measurement signal is transmitted. The digital output signal of the microprocessor is converted back into an analogue signal via a D/A converter, a servo motor being controlled by the amplitude of the analogue signal which is being converted back.

The positioning of the printing systems in such a pen printer can admittedly be represented such that it follows the measurement signal very accurately, however, this is highly complex in a disadvantageous manner since one A/D converter and one D/A converter must be assigned to each individual measurement channel. The reproduction accuracy of the measurement signal to its mapping as a recorded signal is limited by the number of data bits in the digital output of the A/D converter and the digital input of the D/A converter. In consequence, the outlay required for n recording channels, as the required recording accuracy increases rises to 2n converter assemblies for analogue-digital-analogue conversion, a limited error of one quantisation unit of the A/D converter always remains. Furthermore, either k optocouplers or in each case one parallel-series converter between each A/D converter and an optocoupler assigned to them are required in order to transmit a data word which has k bits and can be picked off at the output of an A/D converter.

Thus it is desirable to specify a method for positioning a pen in a recording device, in the case of which recording device the measurement signal is DC isolated from the drive means of the pen, in the case of which method the accuracy of mapping the measurement signal onto the recording signal is as high as possible, with a residual error which is as low as possible, and with little outlay.

SUMMARY OF THE INVENTION

A method for positioning a pen in a recording device for recording the time profile of at least one measurement signal. The recording device has an electric motor for positioning in response to a control voltage the pen. In the method the pulse width modulated signal is provided in a floating manner to a single converter and the signal converter normalizes the difference between the pulse duration

3 and the pulse-pause duration through the sum of the pulse duration and the pulse-pause duration.

DESCRIPTION OF THE PREFERRED EMBODIMENT(S)

Figure 1:
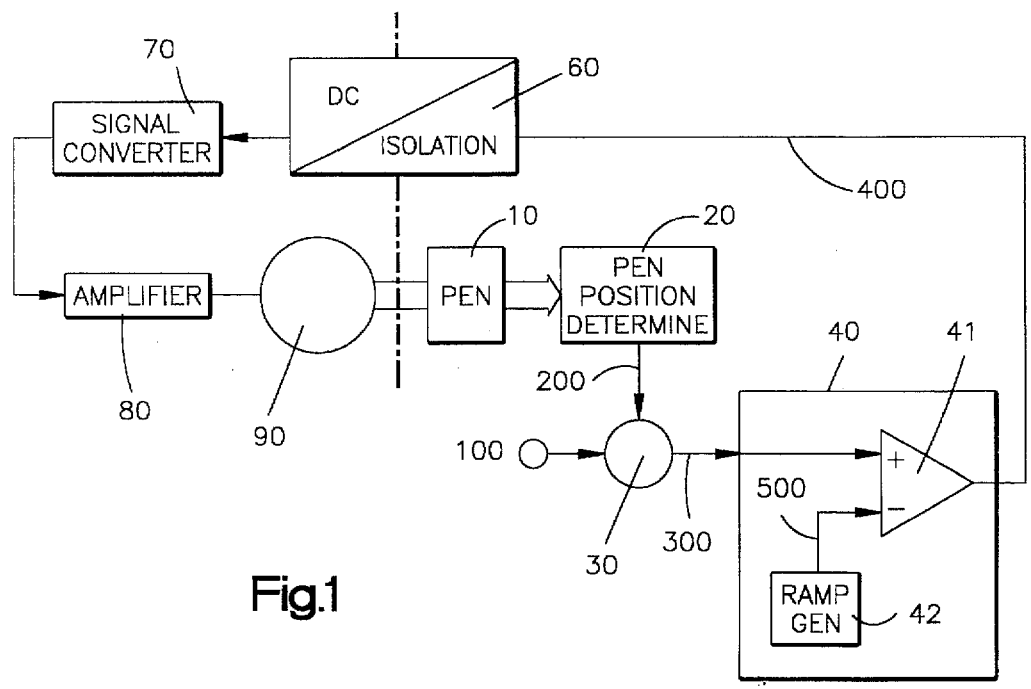
FIG. 1 shows an outline circuit diagram of a positioning control loop.

FIG. 1 shows an outline circuit diagram for a positioning control loop for positioning a pen 10 in a recording device for recording the time profile of at least one measurement signal 100 which can be connected to the device and is suitable for carrying out the method. The recording device itself has means, which are known per se, for transport of a recording medium, at least one printing system composed of an electric drive motor 90, a transmission apparatus for conversion of the rotational drive movement of the drive motor 90 into a translational movement of the pen 10 transversely with respect to the transport direction of the recording medium, and means for holding the pen 10, which means are arranged such that they follow the translational movement of the output drive of the transmission apparatus. Furthermore, the recording device is equipped with means 20 for determining the current pen position with an output of a pen position signal 200 which is adequate for the pen position, and means for controlling the drive motor 90 corresponding to the measurement signal 100 as a function of the current pen position signal 200.

In detail, on the basis of the means 20 for determining the current pen position, a summation device 30 has been provided to whose input the pen position signal 200 and the measurement signal 100 are applied and whose output emits a positioning error 300 as the difference between the measurement signal 100 and the pen position signal 200. The positioning error 300 is a measure of the instantaneous value of the error between the measurement signal 100 to be recorded and the measured value which is actually recorded on the basis of the current pen position and is quantified via the pen position signal 200.

Connected downstream of the summation device 30 is a pulse-width modulator 40 which may be composed of a ramp generator 42 and of a comparator circuit 41 having two inputs. The positioning error 300 is connected to the first input of the comparator circuit 41, and the output signal of the ramp generator 42 is connected to the second input of the comparator circuit 41. The output signal of the ramp generator 42 is called the ramp signal 500. The comparator circuit 41 has an output which is at the same time the output of the pulse-width modulator 40 and at which a pulse-width-modulated positioning error 400 can be picked off.

Connected downstream from the pulse-width modulator 40 are means 60 for DC isolation of the pulse-width-modulated positioning error 400, which is connected in DC terms to the measurement signal 100, to the pen position signal 200 and to the positioning error 300, from the means for controlling the drive motor 90.

Connected downstream from the means 60 for DC isolation is a signal converter 70 which is suitable for converting the pulse-width-modulated positioning error into a signal voltage which is appropriate for the type of drive motor 90.

The function blocks which are DC-isolated from one another are indicated in FIG. 1 by a dashed-dotted line.

4

Connected downstream from the signal converter 70 is an amplifier 80 for matching the rating of the signal converter 70 to the drive motor 90.

The drive motor 90 is mechanically coupled to the means for holding the pen 10, in an electrically insulated manner via a transmission apparatus which is not illustrated. The pen 10 is mechanically connected to the means 20 for determining the pen position.

The positioning error 300 is pulse-width-modulated by the pulse-width modulator 40. The pulse-width-modulated positioning error 400 is transmitted in a floating manner, via the means 60 for DC isolation, to the signal converter 70.

Figure 2A:
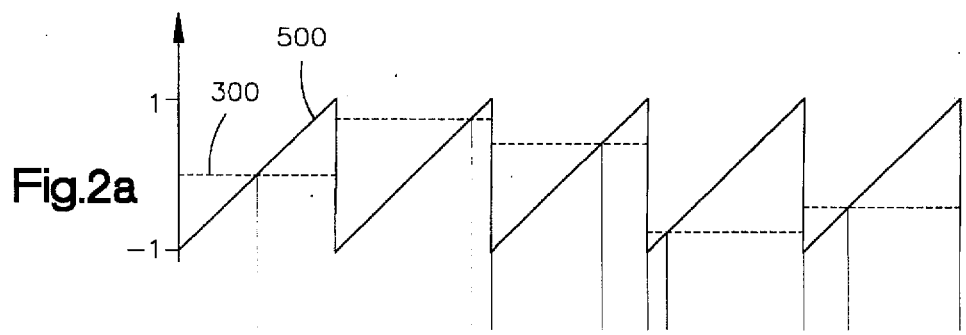
FIG. 2 shows time-profile diagrams for selected signal profiles.
Figure 2B:
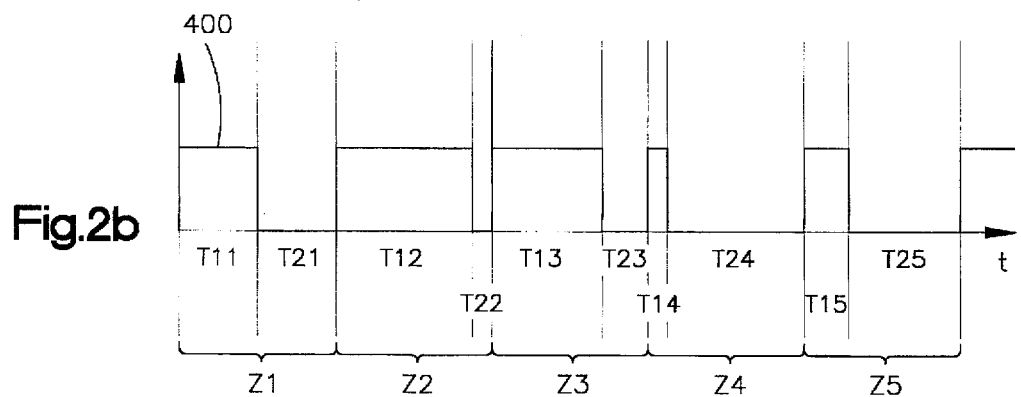

The pulse-width-modulated positioning error 400, whose period according to FIG. 2b is composed of a pulse duration T11 to T15 and of a pulse-pause duration T21 to T25, can be picked off at the output of the pulse-width modulator 40. FIG. 2 shows time-profile diagrams for selected signal profiles. FIG. 2a shows a normalized ramp signal 500 as a sawtooth-waveform signal between the limits "−1" and "1". Furthermore, FIG. 2a shows various states Z1 to Z5 of the positioning error 300 in normalized form as a dashed line between the limits "−1" and "1". FIG. 2b shows the pulse-width-modulated positioning error 400 during the states Z1 to Z5, corresponding to the positioning error 300.

A control voltage for the electric motor is determined using the signal converter from the pulse-width-modulated positioning error 400 by normalizing the difference between the pulse duration and the pulse-pause duration, via the sum of the pulse duration and the pulse-pause duration, during each state Z1 to Z5.

In a particular refinement of the invention the speed of motion of the pen is determined from the magnitude of the difference between the pulse duration and the pulse-pause duration, which difference is normalized via the sum of the pulse duration and the pulse-pause duration. Furthermore, the direction of motion of the pen is determined from the mathematical sign of the difference between the pulse duration and the pulse-pause duration, which difference is normalized via the sum of the pulse duration and the pulse-pause duration.

The positioning error 300 during the state Z1 is equal to zero. The pulse duration T11 of the pulse-width-modulated positioning error 400 and the pulse-pause duration T21 have the same time duration in the state Z1. The value of the positioning error 300 is zero, which means that the pen position is an exact representation of the instantaneous measurement signal 100. There is thus no need for correction of the pen position.

During state Z2, the positioning error 300 is highly positive as a result of a sudden change in the measurement signal 100 and, as a consequence of this, the pulse duration T12 is much longer than the pulse-pause duration T22 of the pulse-width-modulated positioning error 400 in the state Z2.

The large magnitude of the time difference, which is normalized via the sum of the pulse duration T12 and the pulse-pause duration T22, between the pulse duration T12 and the pulse-pause duration T22 causes the pen 10 to move at high speed in a first movement direction transversely with respect to the transport direction of the recording medium.

As the follow-up movement of the pen progresses, the magnitude of the difference, which is normalized via the sum of the pulse duration T12 and the pulse-pause duration T22, between the pen position signal 200 and the measurement signal 100 is reduced, so that the positioning error 300, as illustrated in the state Z3, approaches the value zero. In this case, the pulse duration T13 is furthermore longer than the pulse-pause duration T23, but the magnitude of the difference, which is normalized via the sum of the pulse duration T13 and the pulse-pause duration T23, between the pulse duration T13 and the pulse-pause duration T23 in the state Z3 is less than the difference between the pulse duration T12, which is normalized via the sum of the pulse duration T13 and the pulse-pause duration T23, and the pulse-pause duration T22 in the state Z2. As the magnitude of the difference, which is normalized via the sum of the pulse duration T13 and the pulse-pause duration T23, between the pulse duration T13 and the pulse-pause duration T23 continues to reduce, the speed with which the pen 10 moves transversely with respect to the transport direction of the recording media is reduced, until the state Z1 is reached.

A sudden change in the positioning error 300 into the negative area is illustrated in the state Z4, which results in the pulse duration T14 being much shorter than the pulse-pause duration T24. The magnitude of the difference, which is normalized via the sum of the pulse duration T14 and the pulse-pause duration T24, between the pulse duration T14 and the pulse-pause duration T24 is comparatively large and thus results in the pen 10 moving at high speed transversely with respect to the transport direction of the recording medium and, because of the negative mathematical sign of the difference, which is normalized via the sum of the pulse duration T14 and the pulse-pause duration T24, between the pulse duration T14 and the pulse-pause duration T24, in a second movement direction opposite to the first.

As the pen position signal 200 becomes increasingly close to the instantaneous measurement signal 100, the positioning error 300 approaches the value zero so that, as illustrated in the state Z5, the pulse duration T15 grows and the pulse-pause duration T25 is shortened until the state Z1 is reached. The magnitude of the difference, which is normalized via the sum of the pulse duration T15 and the pulse-pause duration T25, between the pulse duration T15 and the pulse-pause duration T25 is comparatively small, so that the pen 10 is moved with a lower speed of motion. Furthermore, the difference, which is normalized via the sum of the pulse duration T15 and the pulse-pause duration T25, between the pulse duration T15 and the pulse-pause duration T25 is negative, so that the pen 10 is moved in the second movement direction.

The particular advantage of this positioning method can be seen in the fact that a high positioning accuracy is achieved using very simple means, despite DC isolation between the measurement circuit and the motor control loop.

The high positioning accuracy is achieved in particular by making it possible to map the positioning error of measurement signal 100, which mapping is free of residual errors in the control loop, onto the pen position by means of pulse-width modulation, which is characterized by a binary-encoded output signal having a continuous transmission spectrum in the value range. As a result of the normalization, these intrinsically advantageous characteristics remain independent of temperature fluctuations and changes in the absolute values of the components involved resulting from ageing.

The catchment range of the pulse-width modulator 40 can be designed for this purpose such that, on the one hand, a large change in the duty ratio of the pulse-width-modulated positioning error 400 is produced even when the magnitudes of the positioning errors 300 differ little in absolute terms from zero, which corresponds to a high internal gain and thus to the capability to position the pen 10 precisely corresponding to the measurement signal 100 and, on the other hand, limits of the catchment range can be dimensioned such that reaching a limit results in the maximum speed of motion of the pen 10. In this case, the catchment range of the pulse-width modulator 40 is intended to mean the value range of the positioning error 300 which can be transferred into a proportional duty ratio. If the positioning error 300 exceeds the upper limits of the catchment range, the pulse-width-modulated positioning error 400 is permanently in the logic state ONE, the pen 10 being moved with the maximum speed of motion in its first movement direction until the positioning error 300 becomes less than the upper limit of the catchment range. When the positioning error 300 is less than the lower limit of the catchment range, the pulse-width-modulated positioning error 400 is permanently in the logic state ZERO, the pen 10 being moved with the maximum speed of motion in its second movement direction until the positioning error 300 becomes greater than the lower limit of the catchment range. The catchment range of the pulse-width modulator 40 is illustrated in normalized form in FIG. 2 by the limits values "1" and "−1" on the amplitude scale.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for positioning a pen in a recording device for recording the time profile of at least one measurement signal, said recording device having an electric motor for positioning in response to a control voltage said pen said method comprising the steps of:

a) determining the current position of said pen, b) determining a positioning error as the difference between said measurement signal and said current pen position, c) generating a pulse width modulated signal in response to said positioning error, said pulse width modulated signal having a pulse duration and a pulse-pause duration, d) transmitting said pulse width modulated signal in a floating manner to a signal converter, and e) providing from said signal converter said control voltage for said electric motor by normalizing the difference between said pulse duration and said pulse-pause duration through the sum of said pulse duration and said pulse-pause duration.

2. The method of claim 1, wherein the speed of motion of the pen is determined from the magnitude of said difference between said pulse duration and pulse-pause duration, which difference is normalized through the sum of said pulse duration and said pulse-pause duration.

3. The method of claim 1, wherein the direction of motion of said pen is in one direction when said normalized difference between said pulse duration and said pulse-pause duration is positive and in an opposite direction when said normalized difference is negative.

* * * * *